Aug. 7, 1956 H. A. NORBY 2,758,204
WIDE-BAND PHASE SHIFTER NETWORK
Filed Aug. 16, 1955
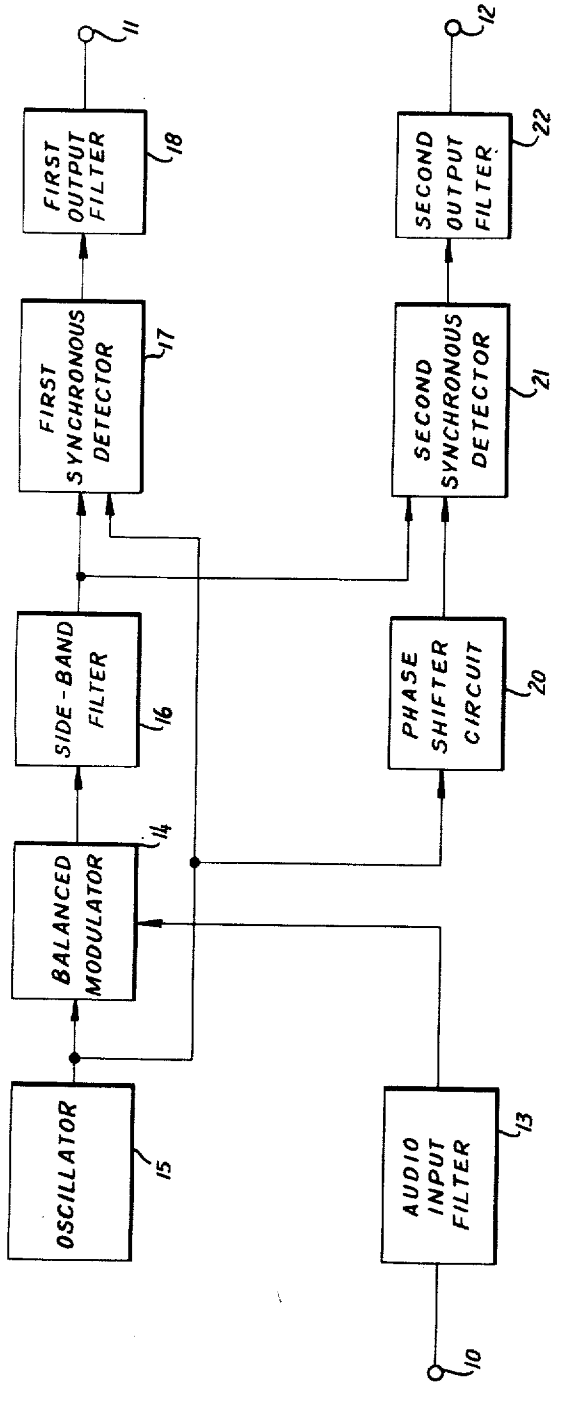
INVENTOR
HAROLD A. NORBY
BY Henry Heyman
ATTORNEY United States Patent Office 2,758,204

Patented Aug. 7, 1956

2,758,204

WIDE-BAND PHASE SHIFTER NETWORK

Harold A. Norby, Culver City, Calif., assignor to Hughes Aircraft Company, Culver City, Calif., a corporation of Delaware Application August 16, 1955, Serial No. 528,707

3 Claims. (Cl. 250—27)

The present invention relates to phase shifters and more particularly to a wide-band network for shifting the phase of signals by a relatively constant amount over a wide range of frequencies.

It is frequently desirable to derive from a given signal two new signals of the same frequency but with the phase angle between the new signals held substantially constant over a wide frequency range, each derived signal preferably having an amplitude characteristic linearly variable with the amplitude of the input signal independently of frequency.

A device that provides the two new signals with the desired phase difference between them is commonly known as a wide-band phase shifter network. Such networks have a wide field of application such as, for example, single side-band telephony accomplished directly at the final carrier frequency without multiple modulators or sharp cut-off filters; high efficiency broadcast transmitters radiating the carrier wave, upper, and lower side-bands from three separate antennas; frequency variation of crystal-controlled carriers of communication transmitters either for carrier control or frequency-shift keying; circular display on cathode-ray tubes over a wide frequency band without adjustment of the phase shift network; and variable speed operation of poly-phase A.-C. motors.

It is, therefore, an object of the present invention to provide a wide-band phase shifter network that shifts the phase of signals by a relatively constant amount over a wide range of frequencies.

It is another object of the present invention to provide a wide-band phase shifter network that operates in such a manner as to produce two audio signals for each audio signal applied to the network, one of the two audio signals being shifted in phase by a predetermined angle from the other of the two audio signals.

The present invention relates to a wide-band phase shifter network of the type previously mentioned. According to its basic concept, a carrier signal modulated by a given signal is applied to a side-band filter which passes only the upper side-band of the modulated signal. The upper side-band is then heterodyned against the carrier signal to produce the first of the two new signals. In a separate channel, the carrier signal is shifted in phase by a predetermined amount and again heterodyned against the upper side band to produce the second of the two new signals, the second signal being shifted in phase from the first signal by the predetermined phase shift of the carrier signal.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

The single figure is a block diagram of a wide-band phase shifter network according to the present invention.

Referring now to the drawing, there is shown a wide-band phase shifter network, according to the present invention, that may operate on audio signals applied to an input terminal 10 to produce corresponding pairs of audio signals at two output terminals 11 and 12 the signals produced at output terminal 12 being phase shifted by a predetermined amount with respect to the signals produced at output terminal 11.

As shown in the drawing, input terminal 10 is connected to an audio input filter 13 which attenuates or, stated differently, filters out applied audio signals at undesirable frequencies. A typical low-pass filter that may be utilized as an audio input filter is shown on page 115 of "Communication Circuits" by Lawrence A. Ware and Henry R. Reed, published in 1947 by John Wiley and Sons, Inc., New York city. Filter 13 is connected to the first input terminal of a balanced modulator 14, the second input terminal of the modulator being connected to an oscillator 15 which generates a carrier signal at a frequency $f_c$. Balanced modulator 14 is used for generating a double side-band signal with the carrier wave suppressed. One type of balanced modulator that may be utilized in the circuit of the present invention is shown and described on page 481 of "Radio Engineering" by Frederick E. Terman, published in 1947 by the McGraw-Hill Book Company, Inc., New York city.

The output terminal of modulator 14 is connected to a side-band filter 16 which suppresses or filters out one of the two side bands, preferably the lower side-band, produced by modulator 14. A band-pass filter that may be adapted for filtering out the lower side-band is shown and described on pages 131–133 of the textbook by Ware and Reed referred to above. The output end of side-band filter 16 is connected to the first input terminal of a first synchronous detector 17, the second input terminal of detector 17 being connected to oscillator 15. Thus, the upper side-band of signals passed by filter 16 and the carrier signal generated by oscillator 15 are simultaneously applied to first synchronous detector 17 which operates as a demodulator for producing audio signals corresponding to the audio signals applied to input terminal 10. A synchronous detector that may be adapted for use in the circuit of the present invention is shown on page 285 of an article entitled "Theory of synchronous demodulator as used in NTSC color television receiver," by Donald C. Livingston, in "Proceedings of the I. R. E.," January 1954.

A first output filter 18 of the type previously mentioned is connected between detector 17 and output terminal 11. Filter 18 passes to output terminal 11 the audio signals produced by detector 17 and suppresses or filters out all other signals.

The wide-band phase shifter network further includes a phase shifter circuit 20 connected between oscillator 15 and the second input terminal of a second synchronous detector 21, the first input terminal of detector 21 being connected, like the first input terminal of detector 17, to the output end of side-band filter 16. Phase shifter circuit 20 is utilized in the network to shift or vary by a predetermined amount the phase of the carrier signal generated by oscillator 15. Phase shifter circuits that may be used are discussed and shown on pages 136 through 141 of the M. I. T. Radiation Laboratory Series book entitled "Waveforms" by Britton Chance, Vernon Hughes, Edward F. MacNichol, David Sayre and Frederic C. Williams, published in 1949 by the McGraw-Hill Book Co., Inc., New York city.

A second output filter 22 is connected between second synchronous detector 21 and output terminal 12. Filter 22 passes to output terminal 12 the audio signals produced by detector 21, which audio signals are shifted in phase by a predetermined angle from the audio signals passed to output terminal 11.

In considering the operation of the phase shifter network of the invention, it will be assumed for purposes of clarity and expediency that a single audio signal at a frequency $f_a$, rather than a band of audio signals having a range of frequencies, is applied to input terminal 10. Accordingly, the audio signal applied to input terminal 10 may be represented by the equation:

$$e_a = E_{ma} \sin 2\pi f_a t \qquad (1)$$

Where $E_{ma}$ is the maximum value of voltage attained by signal $e_a$ and $t$ represents time. Equation 1 may be reduced to a somewhat simpler form, namely, $$e_a = E_{ma} \sin \omega_a t \qquad (2)$$

where $\omega_a = 2\pi f_a$

Oscillator 15 generates a carrier signal at a frequency $f_c$ which may be represented by the equation:

$$e_c = E_{mc} \sin 2\pi f_c t \qquad (3)$$

which may also be reduced to the simpler form of $$e_c = E_{mc} \sin \omega_c t \qquad (4)$$

where $$\omega_c = 2\pi f_c$$

Audio signal $e_a$ is passed by input filter 13 and applied to the first input terminal of balanced modulator 14. Similarly, carrier signal $e_c$ is applied to the second input terminal of balanced modulator 14. In response to signals $e_a$ and $e_c$, balanced modulator 14 produces a modulated signal which may be represented by the equation:

$$e_0 = kE_0 \sin \omega_c t + \frac{ME_0}{2} \cos (\omega_c - \omega_a)t - \frac{ME_0}{2} \cos (\omega_c + \omega_a)t \qquad (5)$$

where $E_0$ represents the average amplitude of modulated signal $e_0$;

M, commonly called the degree of modulation, is the ratio of amplitude variation from the average $E_0$ to the average amplitude $E_0$; and $k$ is the ratio of the amplitude $E_0$ of the carrier component of modulated signal $e_0$ to the amplitude $E_{mc}$ of carrier signal $e_c$ applied to the balanced modulator. With respect to $k$, it should be noted that if balanced modulator 14 were an ideal or perfect modulator, the carrier signal would be entirely suppressed by the modulator and $k$ would equal zero.

Modulated signal $e_0$ is applied to side-band filter 16 which filters out the lower side-band and carrier signal components and passes the upper side-band component to the first input terminal of synchronous detector 17. More particularly, the components of modulated signal $e_0$ represented by $KE_0 \sin \omega_c t$ and $$\frac{ME_0}{2} \cos (\omega_c - \omega_a)t$$

are suppressed by the filter while the component represented by $$\frac{ME_0}{2} \cos (\omega_c + \omega_a)t$$

is passed by it. Accordingly, a single side-band suppressed carrier signal, represented by the equation $$e_s = \frac{ME_0}{2} \cos (\omega_c + \omega_a)t \qquad (6)$$

is applied to the first input terminal of synchronous detector 17.

Carrier signal $e_c$ is applied to the second input terminal of synchronous detector 17 which heterodynes signal $e_c$ against signal $e_s$ to produce a first composite signal $e_{h_1}$ which may be represented by the equation $$e_{h_1} = \frac{ME_0E_{mc}}{2} \sin \omega_c t \cos (\omega_c + \omega_a)t \qquad (7)$$

By familiar trigonometric formulae, Equation 7 may be expanded to:

$$e_{h_1} = \frac{ME_0E_{mc}}{4} [\sin (2\omega_c + \omega_a)t + \sin (-\omega_a)t] \qquad (8)$$

Composite signal $e_{h_1}$ is applied to first output filter 18 which preferably passes the audio component of signal $e_{h_1}$ to output terminal 11. Thus, the audio signal $$E_A = \frac{ME_0E_{mc}}{4} \sin \omega_a t \qquad (9)$$

is developed at output terminal 11.

In addition to being applied to balanced modulator 14, carrier signal $e_c$ is applied to phase shifter circuit 20 which advances or retards the phase of signal $e_c$ by a predetermined amount. Thus, in response to carrier signal $e_c = E_{mc} \sin \omega_c t$, phase shifter circuit 20 produces a phase shifted carrier signal $$e_p = E_{mc} \sin (\omega_c t + \theta) \qquad (10)$$

where $\theta$ is the angle of phase shift. Phase shifted carrier signal $e_p$ is applied to the second input terminal of second synchronous detector 21, the single side-band suppressed carrier signal $e_s$ produced by side-band filter 16 being applied to the first input terminal of the detector. Detector 21 heterodynes signal $e_p$ against signal $e_s$ to produce a second composite signal $e_{h_2}$ which may be represented by the equation $$e_{h_2} = \frac{ME_0E_{mc}}{2} \sin (\omega_c t + \theta) \cos (\omega_c + \omega_a)t \qquad (11)$$

By familiar trigonometric formulae, Equation 11 may be expanded to:

$$e_{h_2} = \frac{ME_0E_{mc}}{4} [\sin (2\omega_c t + \omega_a t + \theta) + \sin (-\omega_a t + \theta)] \qquad (12)$$

Composite signal $e_{h_2}$ is applied to second output filter 22 which passes the audio component of signal $e_{h_2}$ to output terminal 12. Thus, the audio signal $$E_B = \frac{ME_0E_{mc}}{4} \sin (\omega_a t - \theta) \qquad (13)$$

is developed at output terminal 12.

It will be seen from a comparison of Equations 9 and 13 that the phase of audio signals $E_A$ and $E_B$ produced at output terminals 11 and 12, respectively, differs from each other by the angle $\theta$. More particularly, audio signal $E_B$ lags audio signal $E_A$ by the angle $\theta$. It will be recognized by those skilled in the art, however, that signal $E_B$ may also be made to lead signal $E_A$ by the angle $\theta$ by reversing the sense of the phase shift of carrier signal $e_c$ or by filtering out the upper side-band signals and passing only the lower side-band signals. Thus, for example, by phase shifting carrier signal $e_c$ negatively rather than positively as above, Equation 10 would read $$e_p = E_{mc} \sin (\omega_c t - \theta) \qquad (10c)$$

and Equation 13 would read $$E_B = \frac{ME_0E_{mc}}{4} \sin (\omega_a t + \theta) \qquad (13c)$$

It can be seen, therefore, that audio signal $E_B$ may be shifted in phase from audio signal $E_A$ by any desired angle.

It should be noted further that various modifications of the phase shifter network are possible for particular applications of the network without departing from the spirit and scope of the invention. Thus, for example, the network could be modified to have two separate and distinct channels, each channel comprising an input terminal, an input filter, a balanced modulator, a side-band filter, a synchronous detector, and an output filter. The oscillator would be connected directly to the modulator and detector of one channel and to the modulator and, through the phase shifter circuit, to the detector of the other channel.

What is claimed as new is:

1. A wide-band phase shifter network for producing, in response to an applied audio signal, a corresponding pair of audio signals shifted in phase from each other by a predetermined angle, said network comprising: an oscillator for generating a carrier wave at a fixed frequency; first means electrically connected to said oscillator and responsive to the applied audio signal and said carrier wave for producing a modulated signal having upper and lower side-band signal components; a band-pass filter connected to said first means for passing only one of said side-band components; second means electrically connected to said band-pass filter and said oscillator and responsive to said one of said side-band components and said carrier wave for producing a first composite signal including a first audio signal component corresponding to the applied audio signal; a first output filter electrically connected to said second means for passing only said first audio signal component; a phase shifter circuit electrically connected to said oscillator for shifting the phase of said carrier signal by the predetermined angle; third means electrically connected to said phase shifter circuit and said pass-band filter and responsive to said one of said side-band components and said phase-shifted carrier wave for producing a second composite signal including a second audio signal component corresponding to the applied audio signal, said second audio signal component being shifted in phase with respect to said first audio signal component by the predetermined angle; and a second output filter electrically connected to said third means for passing only said second audio signal component.

2. A wide-band phase shifter network that operates on an applied audio signal having a frequency $f_a$ to produce a corresponding pair of audio signals shifted in phase from each other by a predetermined angle, said network comprising: an oscillator for generating a carrier wave at a fixed frequency $f_c$; a balanced modulator electrically connected to said oscillator, said modulator being responsive to the applied audio signal and said carrier wave for producing a modulated signal having upper and lower side-band signal components at frequencies $(f_c+f_a)$ and $(f_c-f_a)$, respectively; a side-band filter electrically connected to said balanced modulator for passing only said upper side-band component at frequency $(f_c+f_a)$; a first synchronous detector electrically connected to said side-band filter and said oscillator, said first detector heterodyning said upper side-band component at frequency $(f_c+f_a)$ and said carrier signal at frequency $f_c$ to produce a first composite signal having a first audio signal component at frequency $f_a$; a first output filter electrically connected to said first detector for passing only said first audio signal component; a phase shifter circuit electrically connected to said oscillator for shifting the phase of said carrier wave by the predetermined angle; a second synchronous detector electrically connected to said side-band filter and said oscillator, said second detector heterodyning said upper side-band component at frequency $(f_c+f_a)$ and said phase shifted carrier wave at frequency $f_c$ to produce a second composite signal having a second audio signal component at frequency $f_a$, said second audio signal component being shifted in phase from said first audio signal component by the predetermined angle; and a second output filter electrically connected to said second detector for passing only said second audio signal component.

3. A wide-band phase shifter network that operates on applied audio signals to produce corresponding audio signals at first and second output terminals, the signals produced at said second output terminal being shifted in phase by a predetermined angle from the signals produced at said first output terminal, said network comprising: an oscillator for generating a carrier wave at a fixed frequency; an input filter for passing only the applied audio signals; a modulator electrically connected to said oscillator and said input filter for heterodyning the applied audio signals against said carrier wave to produce a modulated signal having upper and lower side-band signal components, the frequencies of said upper and lower side-band signal components being equal to the sum and difference, respectively, of the carrier wave frequency and the audio signal frequencies; a side-band filter electrically connected to said modulator for passing only one of said side-band signal components, the other one of said side-band signal components being highly attenuated; first detector means electrically connected to said side-band filter and said oscillator for heterodyning said one of said side-band signal components against said carrier wave to produce a first composite signal having upper and lower output signal components, the frequencies of said upper output signal components being equal to twice the carrier wave frequency plus the applied audio signal frequencies and the frequencies of said lower output signal components being that of the applied audio signals, said first detector means including a first output filter for passing said lower output signal components to the first output terminal; a phase shifter circuit electrically connected to said oscillator for shifting the phase of said carrier wave by the predetermined angle; and second detector means electrically connected to said side-band filter and said phase shifter circuit for heterodyning said one of said side-band signal components against said phase shifted carrier wave to produce a second composite signal having said upper and lower output signal components, the lower output signal components of said second composite signal being shifted in phase by the predetermined angle from the corresponding lower output signal components of said first composite signal, said second detector means including a second output filter for passing said phase shifted lower output signal components to the second output terminal.

No references cited.

Notice of Adverse Decision in Interference

In Interference No. 88,518 involving Patent No. 2,758,204, H. A. Norby, Wide-band phase shifter network, final judgment adverse to the patentee was rendered July 29, 1957, as to claim 1.

[*Official Gazette October 1, 1957.*]